June 2, 1959
T. S. SWARTS
2,888,753
ARITHMETIC INSTRUCTION APPARATUS
Filed March 1, 1956
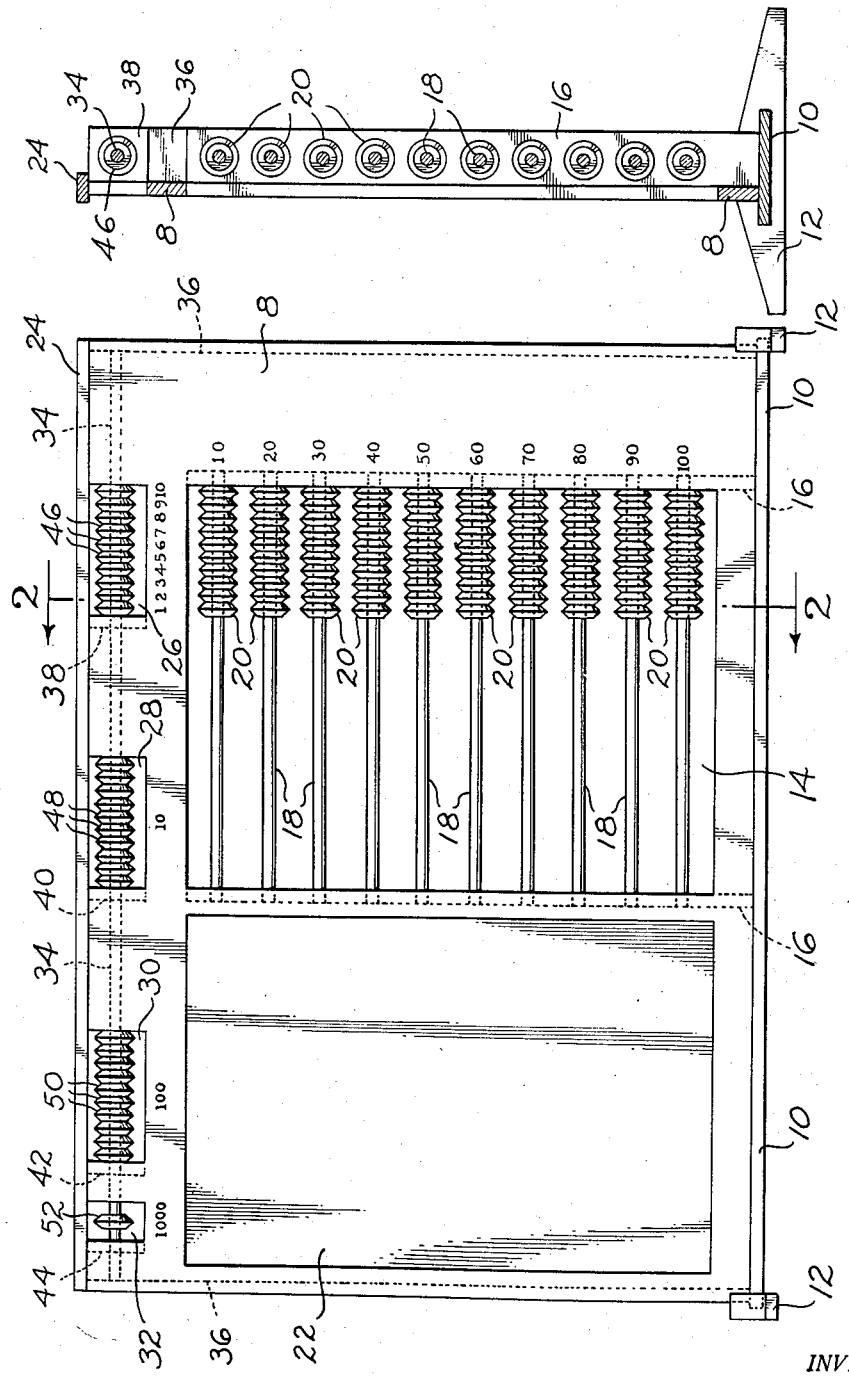
INVENTOR.
Theodore S. Swarts
BY
Agent

United States Patent Office 2,888,753
Patented June 2, 1959

2,888,753

ARITHMETIC INSTRUCTION APPARATUS

Theodore S. Swarts, Springfield, Oreg.

Application March 1, 1956, Serial No. 568,930

2 Claims. (Cl. 35—33)

This invention pertains to educational devices, and relates particularly to apparatus for assisting in the teaching of arithmetic to children.

It is a principal object of the present invention to provide apparatus by means of which to assist in the teaching of arithmetic by the method of association.

Another important object of the present invention is to provide apparatus for assisting in the teaching of arithmetic, which apparatus is adaptable for use in teaching the subjects of addition, subtraction, multiplication and division.

A further important object of this invention is to provide apparatus for assisting in the teaching of arithmetic, which apparatus is of economical construction and is operable with facility to demonstrate with maximum clarity the various steps required in solving problems in arithmetic.

The foregoing and other objects and advantages of the present invention will appear from the following detailed description, taken in connection with the accompanying drawing, in which:

Figure 1 is a view in front elevation of apparatus embodying the features of the present invention; and Figure 2 is a sectional view taken along the line 2—2 in Figure 1.

The apparatus of the present invention, as illustrated by the embodiment shown in the drawing, includes a panel 8 bounded on the bottom edge by plate 10 and supported in an upright position by such means as the laterally spaced foot members 12. A central portion of the panel is cut away, forming a rectangular opening 14. A bracket 16 is secured to the rearward surface of the panel adjacent each of the side edges of the opening 14. These brackets function to support the opposite ends of a plurality of vertically spaced rods 18 which extend horizontally across the opening 14. Mounted slidably upon each of the rods 18 is a plurality of counters, in the form of beads 20. In the embodiment illustrated there are ten beads mounted on each rod. The opening 14, brackets 16, rods 18 and counters 20 are referred to hereinafter as the calculating section of the apparatus.

Mounted or otherwise formed upon the panel 8 adjacent the opening 14, and preferably extending the full length of the latter, is a blackboard 22, the function of which is described in detail hereinafter.

The apparatus is also provided with an answer section by which to indicate visually the final solution of a problem. To this end the upper edge of panel 8 is provided with a plurality of spaced notches, the upper sides of which preferably are closed by means such as the border strip 24 which is secured to the top edge of the panel. The notches form windows 26, 28, 30 and 32. A rod 34 is supported at its end in the brackets 36 which are secured to the rear surface of panel 8 adjacent the side edges of the latter. The rod is also supported intermediate its ends by additional brackets 38, 40, 42 and 44 which are secured to the rear surface of the panel adjacent the left hand edge of the windows 26, 28, 30, 32, respectively.

Mounted upon the rod 34 for sliding movement between the brackets are a plurality of counters, in the form of beads. Thus, in the embodiment illustrated, there are ten beads 46 mounted on the rod for sliding movement between the brackets 36 and 38; ten beads 48 mounted on the rod for sliding movement between the brackets 38 and 40; ten beads 50 mounted on the rod for sliding movement between the brackets 40 and 42; and one bead 52 mounted on the rod for sliding movement between the brackets 42 and 44.

It is to be noted that the beads 46, 48, 50, 52 are slidable on the rod 34 between one position in which they are visible through the windows 26, 28, 30, 32, respectively, and another position in which they are concealed behind the adjacent cover section formed by the panel 8. The purpose of this provision is described more fully hereinafter.

In the embodiment illustrated, the ten beads 46 represent units, and hence it is preferred, for purposes of instruction, to identify the value of these beads in their position of registry with the window 26. This is accomplished in the embodiment illustrated by having the numerals 1 through 10 printed on the panel below the window 26, in the manner shown in Figure 1. Each of the beads 48 represents the value of ten, each of the beads 50 represents the value of 100, and the beads 52 represent the value of 1,000, as indicated by the identifying numerals printed on the panel below the associated windows. In similar manner, each of the beads 20 mounted upon each of the horizontal rods 18 represents the value of one, and hence the additive sum of beads carried on successive rods, totalled from top to bottom, preferably is indicated by the identifying numerals printed on the panel adjacent the right hand end of the opening 14, in line with each of the rods 18.

The function and cooperative relation between the beads carried upon the rods 18 and 34 is best illustrated by the following procedures for solving typical problems of arithmetic. It is to be understood that at the start of each problem all of the beads 20 are positioned to the extreme right end of the rods 18 and that all the beads carried on rod 34 are concealed behind the covers adjacent the respective windows.

To illustrate the addition of 17 and 8, for example, the instructor writes the number 17 on the blackboard adjacent the uppermost rod 18, and the number 8 adjacent the second uppermost rod 18, vertically below the 7 of the number 17. The instructor now explains that the value of a numeral in any number increases by a factor of ten from right to left. Thus, the numeral 7 in the number 17 has a value of seven and the numeral 1 has a value of ten. In addition, the instructor explains that the value of each bead in the windows 26, 28, 30, 32 increases by a factor of ten, i.e. each bead 48 is equal in value to ten beads 46, each bead 50 is equal in value to ten beads 48, and so on, reading from right to left. Thus, each bead 46 represents the right hand unit numeral in a number, each bead 48 represents the tens numerals, each bead 50 represents the hundreds numeral, and so on.

The instructor now explains that the problem of addition is worked out on the apparatus in the same manner as on the blackboard or paper. The first step in solving the problem set forth above is the addition of the unit numerals 7 and 8, and this is illustrated by counting out first seven beads and then eight beads from the two uppermost rods 18, moving the beads to the left during counting. Thus, the ten beads on the uppermost rod and five beads on the second uppermost rod are moved to the left. The instructor now reminds the pupils that each bead 20 has a value of one, as does each of the beads 46, and therefore the ten beads on the uppermost rod are equal to one of the beads 48, which now is brought into view in window 28. The five beads positioned to the left on the second uppermost rod are equal to five beads 46, which now are brought into view in window 26. The beads 20 previously moved to the left on the two uppermost rods 18 now are moved back to the right.

The second step in solving the problem is to add the tens numerals in the problem. Since there is only one of these in the problem, namely the numeral 1 in the number 17, the instructor reminds the pupils that this tens numeral is equal to ten beads 20, and illustrates this by moving the ten beads on the uppermost rod 18 to the left. Since these ten beads are equal to one bead 48, the instructor brings a second bead 48 into view in window 28 and then moves the ten beads on rod 18 back to the right. The instructor now points out that since in the answer section of the apparatus each of the two beads 48 in view in window 28 represents the value of ten, making a total of two tens, or twenty, and since each of the five beads 46 in view in window 26 represents a value of one, or a total of five, the answer to the problem of addition is 25.

The foregoing illustration establishes the fact that the right hand figure in any number is related to the unit beads 46 visible through the window 26, the numeral in the tens column is represented by the beads 48 visible through window 28, the numeral in the hundreds column is represented by the beads 50 visible through window 30, and so on.

To illustrate a problem in subtraction, for example 1861 minus 369, the instructor writes the number 1861 on the blackboard and immediately below it the number 369, with the digits, tens and hundreds columns aligned vertically. The instructor now brings one bead 46 into view through window 26, six beads 48 into view through window 28, eight beads 50 into view through window 30 and one bead 52 into view in window 32. This establishes in the answer section the numeral 1861, from which the numeral 369 is to be subtracted.

The first step in subtraction is to subtract 9 from 1. Since 9 cannot be taken from 1, it is necessary to add ten unit beads to the unit window 26 by subtracting one of the ten value beads 48 from the window 28. Thus, since preliminary calculations are made on the calculating section of the apparatus, the instructor moves one of the beads 48 to a position behind the cover adjacent window 28 and moves the ten beads 20 from the uppermost rod 18 to the left. Similarly, the one bead 46 visible through window 26 is moved to a position behind its adjacent cover and replaced temporarily in the calculating section by moving one bead 20 on the second uppermost rod 18 to the left. Thus, there are eleven beads 20 positioned to the left on the two uppermost rods 18. From these eleven beads, nine are subtracted to complete the first step of the problem. The nine beads thus subtracted, by moving nine beads to the right on the two uppermost rods 18, leaves a remainder of two beads. Thus, two beads 46 are moved to the left from behind the cover into view through window 26, and the two beads remaining on the uppermost rod 18 are returned to their right hand position.

The second step is to subtract the tens numeral 6 in the number 369 from the five beads now visible through window 28. Since 6 cannot be subtracted from 5, it is necessary to add ten beads to the five beads 48 shown in window 28, by removing one of the beads 50 from view through window 30. In so doing, the ten beads 20 on the uppermost rod 18 are moved to the left, to represent the one bead 50 removed. Five beads 20 are then moved to the left on the second uppermost rod, and the five beads 48 removed to a position behind the cover adjacent the window 28. Six beads then are subtracted from the fifteen beads 20 positioned to the left on the two uppermost rods, leaving a balance of nine. Thus, nine beads 48 are moved into view through window 28.

The third step in solving the problem is to subtract the hundred values, i.e. to subtract three beads 50 from the seven visible through window 30. This is done by removing three of the beads 50 to a position behind the adjacent shield, leaving four visible through the window 30.

Since the thousand value, represented by bead 52 visible through window 32, was not altered in the third step, the bead 52 remains visible. Thus, there remains visible in the answer section one bead 52, four beads 50, nine beads 42, and two beads 46, indicating the answer to the subtraction problem to be 1492.

A third illustration is the multiplication of the number 56 by the number 32. These numbers are first written upon the blackboard 22 in the conventional manner for multiplication. The first step of the problem is to multiply 6 by 2, and this is illustrated by moving twelve beads 20 to the left on the two uppermost rods 18, preferably the ten beads on the uppermost rod and two beads on the second uppermost rod. The instructor explains that these twelve beads represents two groups of six, and since the numerals 6 and 2 in the problem are arranged in the digit column, each of these beads 20 has a value of 1. Thus, one bead 48 is moved into view through window 28 to represent the ten beads on the uppermost rod 18, and two beads 46 are moved into view through window 26 to represent the two beads moved to the left on the second uppermost rod 18.

The second step in the multiplication is to multiply 50 times 2, the instructor explaining that this is so because the numeral 5 in the number 56 appears in the tens column. Thus, the instructor moves two groups of five beads on the third uppermost rod 18 to the left, each bead representing the value of ten, or a total of 100. Thus, one bead 50 is moved into view through window 30.

The third step in the problem is to multiply 6 by 30, since the numeral 3 is in the tens column. Three groups of six beads 20 are moved to the left on the fourth and fifth uppermost rods 18, providing ten beads on the fourth rod and eight beads on the fifth rod, each bead representing the value of ten. Thus, one bead 50 is moved into view through window 30 to represent the ten beads on the fourth rod, and eight beads 48 are moved into view through window 28 to represent the eight beads on the fifth rod 18.

The fourth step in the problem is to multiply 50 by 30, since the numerals 5 and 3 both appear in the tens column. Thus, three groups of five beads 20 are moved to the left on the sixth and seventh uppermost rods 18, each bead representing the value 100. Thus, the one bead 52 is moved into view through window 32 to represent the ten beads on the sixth uppermost rod 18, and five beads 50 are moved into view through window 30 to represent the five beads moved to the left on the seventh uppermost rod 18. Thus, the final answer of 1792 to the multiplication problem appears in the answer section of the apparatus as represented by the one bead 52 in window 32, the seven beads 50 in window 30, the nine beads 48 in window 28 and the two beads 46 in window 26.

A fourth illustration is the division of 956 by 2. The instructor explains that since division is the reverse of multiplication, division of the number begins at the left. Hence, the first step is the division of 900 by 2. This is illustrated by moving nine of the beads 20 to the left on the uppermost rod 18, and separating the nine beads into groups of two. Thus, there is found four groups of two beads each, with a single bead left over. Since each group of two beads represents the value 100, four beads 50 are moved into view through window 30. Now, ten beads 20 are moved to the left on the second uppermost rod 18 to represent the single bead left over from the groupings on the uppermost rod.

To the ten beads moved to the left on the second uppermost rod 18, there is added five beads moved to the left on the third uppermost rod, giving a total of fifteen beads on the second and third rods. The ten beads on the second rod represent the single bead left over from the grouping on the first uppermost rod, and the five beads on the third uppermost rod represent the numeral 5 in the number 9$\underline{5}$6. The fiteen beads then are separated into groups of two, giving seven groups and a single bead left over. Since each of the groups represents the value ten, seven beads 48 are moved into view through window 28. The ten beads on the fourth uppermost rod 18 now are moved to the left to represent the value of the single bead left over from the groupings on the second and third uppermost rods.

On the fifth uppermost rod 18 six beads are moved to the left to represent the figure 6 in the numeral 95$\underline{6}$. These six beads, together with the ten beads moved to the left on the fourth uppermost rod, are separated into groups of two, producing eight groups with no beads left over. Thus, since each group of two beads represents the value one, eight beads 46 are moved into view through window 26. Thus, the solution to the problem of division is 478, as indicated by the four beads 50, the seven beads 48 and the eight beads 46, visible through the windows 30, 28 and 26, respectively.

From the foregoing discussion, it will be apparent that the beads 20 carried on the horizontal rods 18 are employed to illustrate the preliminary calculations leading to the solution of a problem and that the values assignable to the beads 20 are related to any particular group of beads carried in the answer section, i.e. upon rod 34. In this manner, values derived from preliminary calculations are transferrable to the answer section of the apparatus logically and without confusion to the pupils. Moreover, the calculations involving numerical values are made by association with objects, namely beads, whereby to lend a practical significance to otherwise abstract values and thus greatly facilitate the understanding of the subject of arithmetic.

It will be apparent to those skilled in the art that various changes and modifications of the structural details described hereinbefore may be made without departing from the scope and spirit of this invention. For example, the embodiment illustrated and described hereinbefore is capable of use with problems involving the maximum value of 1999. It will be apparent that the apparatus may be enlarged to any desired maximum, by providing additional windows and associated beads in the answer section. For example, the window 32 may be enlarged and additional beads 52 provided, as in the preceding windows, and additional windows provided to the left for values increasing by the factor 10.

The physical arrangement of the blackboard section, the calculating section and the answer section, may be modified as desired, and the beads replaced with any other suitable form of counter. The counters associated with the windows of the answer section may be variously colored, if desired, although it is preferred that they be colored uniformly so as to prevent the pupils from associating the values of the counters with specified colors.

The foregoing and other changes and modifications may be made, as will be apparent. Accordingly, it is to be understood that the foregoing description is primarily illustrative of the invention and is not to be considered as limiting the scope thereof.

Having now described my invention and the manner in which the same may be used, what I claim as new and desire to secure by Letters Patent is:

1. Arithmetic instruction apparatus comprising an upright panel member, a calculating section in said panel member, said calculating section including a single opening in said panel member and a plurality of horizontal support members disposed across said opening, ten first counters mounted slidably on each horizontal member, an answer section independent of and spaced from said calculating section, said answer section including a plurality of segments each having a window portion and a cover portion, the segments being arranged adjacent each other in horizontal succession, support means mounted adjacent each segment and extending across the window and cover portions thereof, ten second counters mounted slidably on the support means of at least the segments preceding the last segment, the support means of the last segment having at least one second counter mounted slidably thereon, the second counters being movable selectively to positions registering with the window portion and the cover portion, each of the second counters associated with the right hand segment of said succession having a value of one, and each of the second counters associated with each succeeding segment having a value ten times greater than each counter associated with the segment next preceding it in order.

2. Arithmetic instruction apparatus comprising a blackboard section, a calculating section adjacent the blackboard section and including a plurality of vertically spaced horizontal rod members, ten first counters mounted slidably on each horizontal member, an answer section spaced above the blackboard section and calculating section and including a plurality of segments each having a window portion and a cover portion, the segments being arranged adjacent each other in horizontal succession with said window and cover portions being disposed in alternate relation, support means mounted adjacent each segment and extending across the window and cover portions thereof, and ten second counters mounted slidably on the support means of at least the segments preceding the last segment, the support means of the last segment having at least one second counter mounted slidably thereon, the second counters being movable selectively to positions registering with the window portion and the cover portion, each of the second counters associated with the right hand segment of said succession having a value of one, and each of the second counters associated with each succeeding segment having a value ten times greater than each counter associated with the segment next preceding it in order.

References Cited in the file of this patent

UNITED STATES PATENTS

| 37,825 | Reffelt | Mar. 3, 1863 |
| 541,787 | Hegewald | June 25, 1895 |
| 692,019 | Kolshorn | Jan. 28, 1902 |
| 861,541 | Rieck | July 30, 1907 |
| 2,646,631 | Lazar | July 28, 1953 |

FOREIGN PATENTS

| 604,998 | Germany | Nov. 1, 1934 |
| 839,728 | Germany | May 23, 1952 |